(12) United States Patent
Pagny et al.

(10) Patent No.: US 11,529,852 B2
(45) Date of Patent: Dec. 20, 2022

(54) VEHICLE TAILGATE

(71) Applicant: COMPAGNIE PLASTIC OMNIUM, Lyons (FR)

(72) Inventors: Philippe Pagny, Ambronay (FR); Laurent Seymat, Viriville (FR); Pascal Depardon, Meximieux (FR); Pierre-Anthony Galle, Ecully (FR)

( * ) Notice: Subject to any disclaimer, the term of this patent is extended or adjusted under 35 U.S.C. 154(b) by 788 days.

(21) Appl. No.: 16/474,763

(22) PCT Filed: Dec. 21, 2017

(86) PCT No.: PCT/FR2017/053786
§ 371 (c)(1),
(2) Date: Jun. 28, 2019

(87) PCT Pub. No.: WO2018/122512
PCT Pub. Date: Jul. 5, 2018

(65) Prior Publication Data
US 2019/0344644 A1    Nov. 14, 2019

(30) Foreign Application Priority Data

Dec. 30, 2016  (CN) .......................... 201621493549.X

(51) Int. Cl.
*B60J 5/10*    (2006.01)
*B29C 65/48*   (2006.01)
(Continued)

(52) U.S. Cl.
CPC ................. *B60J 5/10* (2013.01); *B29C 65/48* (2013.01); *B29K 2623/12* (2013.01); *B29L 2031/30* (2013.01)

(58) Field of Classification Search
CPC ... B60J 5/10; B60J 5/107; B60J 5/0481; B60J 5/101; B60J 10/34; B60J 10/365;
(Continued)

(56) References Cited

U.S. PATENT DOCUMENTS 4,773,700 A    9/1988  Sannomiya

FOREIGN PATENT DOCUMENTS

| CN | 205573572 U | 9/2016 | |
| EP | 3187349 A1 * | 7/2017 | .............. B60J 10/34 |
| JP | 2005-022581 A | 1/2005 | |

OTHER PUBLICATIONS

PCT/FR2017/053786 English Translation of the Written Opinion of the International Searching Authority dated Aug. 2, 2018.
(Continued)

*Primary Examiner* — John L Goff, II
(74) *Attorney, Agent, or Firm* — Anglehart et al.

(57) ABSTRACT

A vehicle tailgate is made of a plastic material and includes: an inner panel, an outer panel and a first glue bead applied between the inner panel and the outer panel, such that the inner panel and the outer panel are assembled via the glue bead and an inner space is disposed between the inner panel and the outer panel. The outer panel includes: a skin with an appearance surface; a housing configured to receive an optical unit, delimited by a peripheral wall joined to the skin; and a cavity delimited by the skin, at least a portion of the peripheral wall of the housing, and walls projecting from the housing towards an inner face of the skin. At least one of the walls projecting from the housing towards the inner face of the skin does not touch the inner face of the skin, such that there is a gap between the at least one wall and the inner face of the skin. The gap is sealed by a second glue bead.

13 Claims, 4 Drawing Sheets

(51) Int. Cl.
*B29K 623/00* (2006.01)
*B29L 31/30* (2006.01)

(58) Field of Classification Search
CPC ......... B29L 2031/30; B29L 2031/3055; B29K 2623/12; B29C 65/48; B60Q 1/2619; B60Q 1/2638
USPC .............................................. 49/501; 296/56
See application file for complete search history.

(56) References Cited

OTHER PUBLICATIONS

PCT/FR2017/053786 International Preliminary Report on Patentability Chapter I dated Jul. 2, 2019.
PCT/FR2017/053786 International Search Report dated Aug. 2, 2018.
PGT/FR2017/053786 International Search Report Search Strategy dated Aug. 2, 2018.
PCT/FR2017/053786 Translation of the ISR dated Aug. 2, 2018.
PCT/FR2017/053786 Written Opinion of the International Searching Authority dated Aug. 2, 2018.

\* cited by examiner

VEHICLE TAILGATE

TECHNICAL FIELD

This invention relates to the technical field of vehicle tailgates, in particular tailgates made of a plastic material.

BACKGROUND

The vehicle tailgates made of a plastic material usually comprise inner panels forming structural parts and outer panels forming visible skins. Sometimes, the vehicle tailgates also comprise optical units arranged on the two left and right ends of a tailgate, called rear lights.

The appearance of the tailgates varies depending on different vehicle styles. Consequently, the appearance of the rear lights integrated in the tailgates also varies considerably. Thus, housings are provided on the tailgates for receiving the optical units; the shape of these housings must be designed at least to be able to act as interface for integration and fixation of the optical units; in addition, it must match the style of the tailgates.

Apart from the requirements in terms of aesthetic quality, there are important constraints for tightness (in particular water-tightness) inside the tailgates, because the inner space of the tailgates comprises electrical equipment. Consequently, it is known to ensure the water-tightness of the tailgates by using a glue bead which allows to assemble an inner panel with an outer panel and forms a continuous sealing path on the entire perimeter, and in particular at the housings of the rear lights. This glue bead generally consists of a glue applied on the inner face of the outer panel. Due to the vehicle mass production requirements, the glue bead is usually applied by a robot. The assembling by gluing requires that the direction in which the inner and outer panels are brought must be compatible with the general three-dimensional shapes of the tailgates and the gluing path, so as to avoid any interference for example due to shapes related to undercut. In addition, it is desirable to be able to apply the glue bead everywhere, even on highly complex shapes, while facilitating the access of the glue applicator moved by the robot. To ensure the continuity of the path imposed by these tightness constraints, it is known to add additional walls called "bridge" on some areas of the tailgate, to improve the continuity of the gluing path. One solution consists in using bridges attached to the outer panels, for example refer to the application WO2009056775 filed in the name of the present applicant. Another solution consists in obtaining these bridges directly by moulding, during the injection of the outer panels, refer for example to the patent CN205573572U filed in the name of the present applicant. According to this patent, additional walls forming a bridge are added to walls forming angles of about 90° or less than 90° which surround the housings of rear light and which are on the inner face of the outer panel.

However, the solution which consists in adding additional walls forming a bridge on an outer panel is highly complex and is not favourable from a financial and industrial point of view. The other solution which consists in moulding bridge walls with an outer panel does not have the same problem, but this solution is quite likely to create appearance defects on the visible face of the outer panel. These appearance defects due to injection moulding may include for example sink marks or flow lines and be located at the junction of the bridge walls with the inner face of the outer panel. Consequently, this has a negative effect on the perceived quality of the vehicle. In the field of plastic moulding, visual defects are a well-known problem. To reduce these visual defects, one known solution consists, depending on the technical design possibilities and in particular the vehicle style shapes, in positioning the junction of the bridge walls on the outer panel opposite or near style lines or edges of the vehicle, so that the visual defects caused by the junction are less visible. It is also possible to reduce the thickness of the bridge wall locally near the junction of the bridge walls with the inner face of the outer panel.

Nevertheless, these known solutions do not completely eliminate the visual defects. Since the visual defects are due to the junction between the bridge walls and an inner face of an outer panel, it is known to take advantage of the movement of a movable slider in a mould in order to eliminate this junction, in other words to make sure that the bridge walls do not come into contact locally with the inner face of the outer panel. The movement of the movable slider is useful to demould cavities formed during moulding the outer panels. However, the lack of contact between the bridge walls and the inner face of the outer panel generates a discontinuity of the gluing path and therefore of the tightness between the inner panel and the outer panel of the tailgate: one must therefore proceed differently.

SUMMARY

According to embodiments of the present disclosure, it is conceived of adding, in addition to a conventional glue bead, a local glue bead at a gap between the bridge walls and an inner face of an outer panel. The gap corresponds to the deliberate discontinuity generated at the bottom of the bridge wall, located near the inner face of the outer panel. Consequently, on the basis of the conventional assembly method by gluing of the two outer and inner panels, the conventional gluing and tightness functions are provided by a main (and preferably unique) glue bead, while the bonding by gluing and especially the water-tightness between the inner face of the outer panel and the free ends of the bridge walls, which are not in contact with the inner face of the outer panel, are guaranteed by an additional glue bead which fills the above-mentioned gap.

One object of the present disclosure thus consists in proposing a vehicle tailgate made of a plastic material, the tailgate comprising an inner panel, an outer panel and a first glue bead applied between the inner panel and the outer panel so as to assemble the two panels by gluing and to create a water-tight inner space between the two panels, the outer panel having a skin with an appearance surface, a housing for receiving an optical unit which is delimited by a peripheral wall joined to the skin, and a cavity delimited at a time by the skin, at least a portion of the peripheral wall of the housing and walls projecting from the housing towards the inner face of the skin. According to embodiments of this invention, at least one wall of the walls projecting from the housing towards the inner face of the skin and participating in delimiting the cavity does not touch the inner face of the skin, such that there is a gap between said at least one wall and the inner face of the skin, and a second glue bead is applied at the gap in order to seal the gap and thus ensure that the cavity is water-tight.

"Skin" means the main flat portion of the outer panel which does not comprise any housing or hole for an attached part such as an optical unit or a rear window.

In a tailgate according to embodiments of the invention, the walls projecting from the housing towards the inner face of the skin, which participate in delimiting the cavity, can comprise a bridge wall and a lateral wall. The bridge wall covers a corner formed by the housing and the inner face of the skin, and thus the first glue bead avoids this corner and is applied on the bridge wall, making it easier to apply with a robot. The lateral wall closes the cavity on at least one side of the cavity and it can be located on a lateral face of the tailgate when a movable slider moves, during moulding of the cavity, along the Y axis towards the median plane $Y_0$ of the vehicle, or be located on a side of the cavity opposite the lateral face of the tailgate (this side is closer to the median plane $Y_0$) when the movable slider moves, during the moulding of the cavity, along the Y axis towards the two lateral planes $Y_{lat}$ of the vehicle. The gap may be present between the bridge wall and the inner face of the skin, or between the lateral wall and the inner face of the skin, or between the inner face of the skin and both the bridge wall and the lateral wall. In particular, when the lateral wall is located on the lateral face of the tailgate, since the lateral wall forms a portion of the skin, there is no gap between the lateral wall and the inner face of the skin.

Note that in the context of the invention, the qualifiers "inner" and "outer" are understood relative to the inside and outside of the vehicle. In addition, references to orientation terms, such as "longitudinal X axis", "transverse Y axis", "vertical Z axis", "front", "rear/back", "above", "top/upper", "below", "bottom/lower" etc. are understood with reference to the usual orientation of motor vehicles.

Advantageously, the gap is located behind or near a style line which is visible on the appearance surface of the skin. This allows to render the visual defects which are always eventually generated less visible.

Advantageously, the first glue bead and the second glue bead are applied in such a way that they are deposited one on top of the other (i.e. they overlap) and cross each other, and their up and down overlap order may be interchanged. Usually, the first glue bead is applied on the inner face of the outer panel and forms a continuous sealing binding. The first glue bead and the second glue bead are advantageously formed of water-tight thermoplastic or thermosetting glue applied by a robot.

In an alternative embodiment of a tailgate according to the invention, it is possible that amongst one of the walls of the cavity, the thickness at the free end of said wall which does not touch the inner face of the skin (i.e. a "suspended" end due to the presence of the gap) is reduced to facilitate passage of the second glue bead under the free end, in order to improve the water-tightness on both sides of the wall concerned. The thickness reduction is advantageously located on the outer face (oriented towards the inner panel) of the bridge wall or of the lateral wall. Alternatively, amongst these walls, the free end of said at least one wall which does not touch the inner face of the skin may form a groove for receiving the second glue bead.

BRIEF DESCRIPTION OF THE DRAWINGS

The attached figures schematically illustrate non-limiting embodiments of the invention which are given solely by way of example. The invention will be better understood and its advantages and features will become clearly apparent on reading the description below and referring to the attached figures. Note that the directions, shapes, angles, dimensions (including lengths and thicknesses), distances and proportions illustrated on the attached figures are given for indication only and are not limiting in any way the invention. Amongst these figures.

DETAILED DESCRIPTION

Embodiments of a tailgate according to the invention are described below, referring to the attached figures in which the identical numerical references are used to designate similar elements having similar functions.

Figure 1:
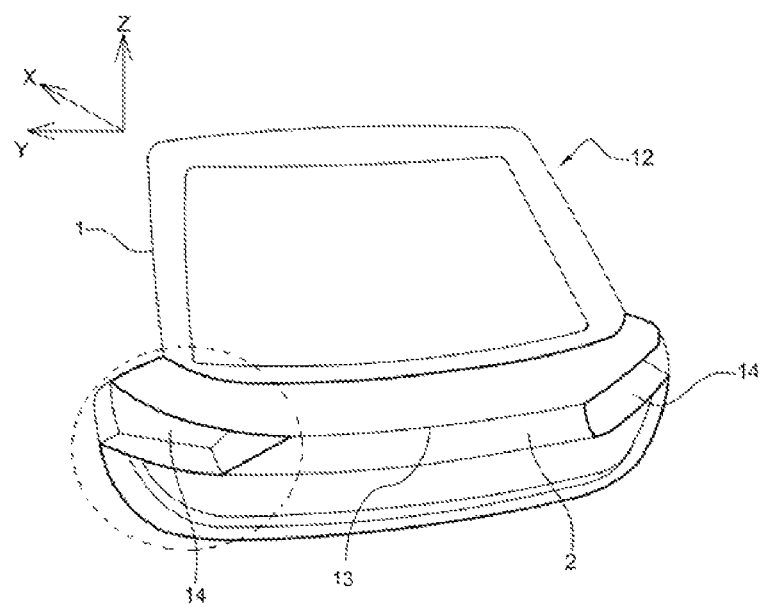
FIG. 1 is a general schematic view of a tailgate seen from the rear of a vehicle, in which the directions X, Y and Z of the vehicle are illustrated indicatively.

FIG. 1 is a general schematic view of a tailgate 12 seen from the rear of a vehicle, in which a portion of the outer panel 2 of the tailgate 12 is removed in order to reveal the inner panel 1 opposite this part, and the directions X, Y and Z of the vehicle are illustrated indicatively. This tailgate is designed to include housings 14 intended to receive optical units (rear lights). In this embodiment, the rear lights are for example arranged symmetrically on the two lateral edges of the tailgate. Since the appearance style of the vehicles varies considerably, the shape of the housings 14 located on the tailgate may also vary considerably. This shape may for example be very deep and have abrupt walls which form substantially right or even acute angles with the appearance surface of the tailgate (visible from outside of the vehicle) or with the bottom of the housings.

Figure 2:
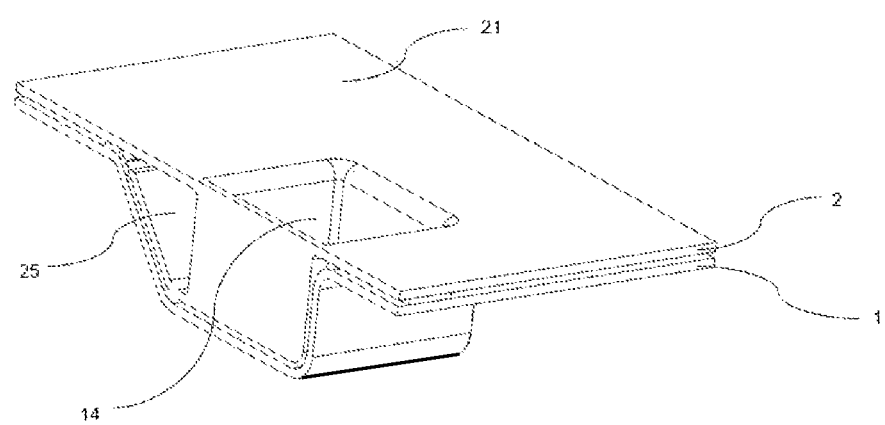
FIG. 2 is a three-dimensional schematic exploded view of the partial area of a rear light surrounded by a circle in FIG. 1.
Figure 3:
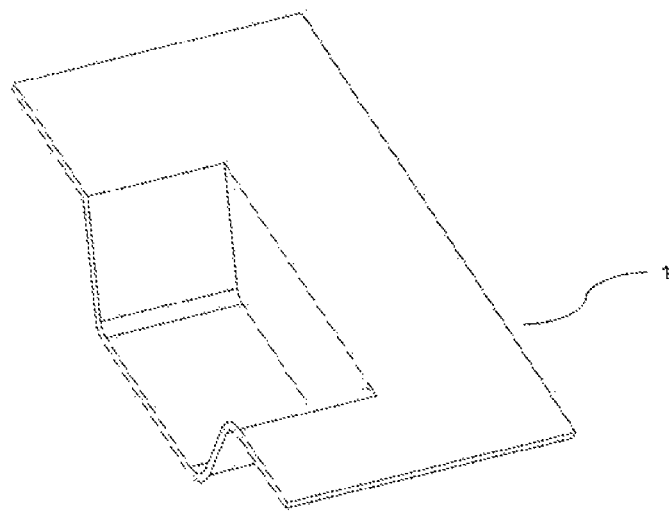
FIG. 3 is a three-dimensional schematic view of the inner panel of FIG. 2.

As shown on FIG. 2 which is an exploded view of the partial area of a rear light shown on FIG. 1, the tailgate 12 comprises an inner panel 1 and an outer panel 2. Generally, the inner panel 1 is a structural part of the vehicle, which is also called a lining, while the outer panel 2 is an appearance part. For example, the inner panel 1 is a tailgate frame made of a thermoplastic (such as polypropylene—PP) or thermosetting plastic material which is preferably SMC ("Sheet Moulding Compound"); the outer panel 2 is the appearance skin of the tailgate which is made of a thermoplastic material, for example polypropylene. The inner and outer panels often have complex three-dimensional shapes which are obviously not limited to the shapes illustrated indicatively on the attached figures.

As shown on FIGS. 2 and 5 to 9, the outer panel 2 comprises a skin 21 forming the appearance surface and at least one housing 14 for receiving an optical unit. As shown on FIG. 5, the housing 14 is delimited by a peripheral wall 22 joined to the skin 21. As shown on FIGS. 2, 5 and 6, the outer panel 2 comprises a cavity 25 delimited at a time by the skin 21, the peripheral wall 22 of the housing 14 and the walls projecting from the housing 14 towards the inner face of the skin 21. The walls which project from the housing 14 towards the inner face of the skin 21 and which participate in delimiting the cavity 25 comprise a bridge wall 23 and a lateral wall 26. The bridge wall 23 is for example illustrated on FIGS. 6 and 7 and the lateral wall 26 is for example illustrated on FIG. 7. In this embodiment, the bridge wall 23 and the lateral wall 26 do not come into contact with the inner face of the skin 21, so that there is a gap 27 present between the end (the bottom) of the bridge wall 23 and the inner face of the skin 21, and between the end (the bottom) of the lateral wall 26 and the inner face of the skin 21. It is understood that the gap 27 is not limited to what is illustrated on the figures and it is for example possible that there is a gap 27 only between the bridge wall 23 and the inner face of the skin 21.

Figure 7:
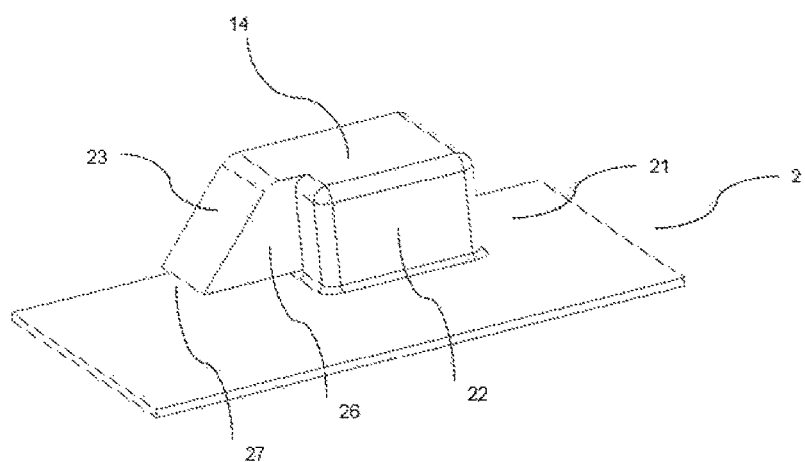
FIG. 7 is a three-dimensional schematic view from yet another angle of the outer panel of FIG. 5.
Figure 8:
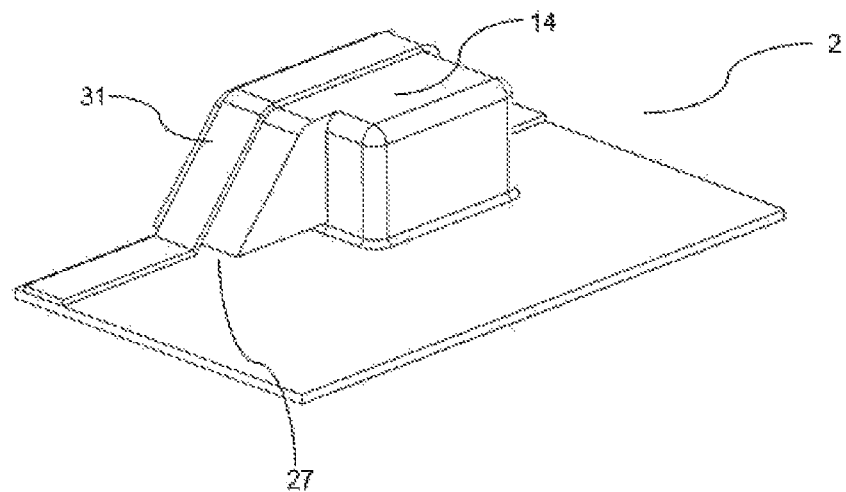
FIG. 8 is a three-dimensional schematic view of the inner face of the outer panel of FIG. 7 to which the first glue bead is applied.

As shown on FIG. 7, the lateral wall 26 closes the cavity 25 on one side of the cavity 25. In the example shown on FIG. 7, the lateral wall 26 is located on a side of the cavity opposite the lateral face of the tailgate 12 (this side is closer to the median plane $Y_0$), which means that during the moulding of the cavity 25, the movable slider moves along the Y axis towards the two lateral planes $Y_{lat}$ of the vehicle. Those skilled in the art will understand (see below) that alternatively, in the case where during the moulding of the cavity, the movable slider moves along the Y axis towards the median plane $Y_0$ of the vehicle, the lateral wall 26 is located on a lateral face of the tailgate 12. In particular, when the lateral wall 26 is located on a lateral face of the tailgate 12, since the lateral wall 26 itself is a part of the skin of this lateral face, there is no gap between this lateral wall 26 and the inner face of the skin 21, and the lateral wall 26 is visible when the tailgate 12 is raised.

In addition, note that amongst the skin 21 of the outer panel 2, the peripheral wall 22 and the bridge wall 23, only the skin 21 is visible from outside of the vehicle when the optical units (for example the rear lights) are well installed in position in the housings 14.

Figure 4:
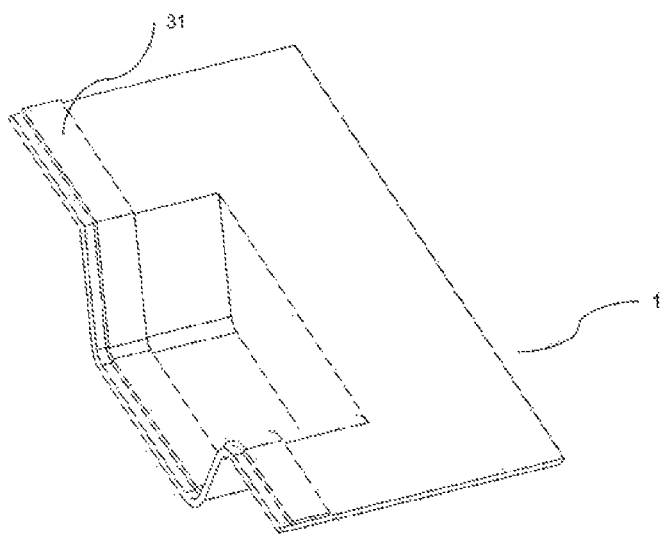
FIG. 4 is a three-dimensional schematic view of the inner panel of FIG. 3 to which the first glue bead is applied.
Figure 5:
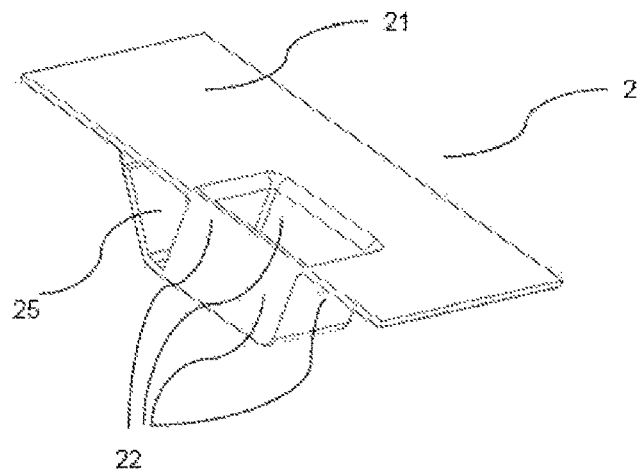
FIG. 5 is a three-dimensional schematic view of the outer panel of FIG. 2.

Usually, the inner panel 1 and the outer panel 2 are assembled by gluing with the glue bead 31 which is called the first glue bead, and this glue bead 31 is advantageously used to seal the inner space between the inner and outer panels such that this inner space remains dry. This protects the electrical wires and equipment located in the tailgate and between the inner and outer panels against humidity. A robot can be used to apply the glue on the inner face of the outer panel 2 in order to form the glue bead 31, as shown on FIG. 8. Obviously, the glue bead 31 can also be applied on the face of the inner panel 1 which is intended to be glued to the outer panel 2, as shown on FIG. 4. Then, the outer panel 2 and the inner panel 1 are bonded together and a continuous sealing binding is obtained by pressing the inner and outer panels together with a suitable pressure in the main direction of assembly of the tailgate 12. Preferably, this sealing path itself forms a closed circuit. Since the bridge wall 23 is used to cover the angle (the corner) formed by the housing 14 and the inner face of the skin 21 (as shown on FIG. 6), the glue bead 31 avoids this angle and passes by the bridge wall 23 (as shown on FIG. 8), which allows therefore to improve the abrupt degree of the gluing path, in order to facilitate the access of the adhesive applicator of the robot and thus the compression of the inner and outer panels to bond them together.

Figure 9:
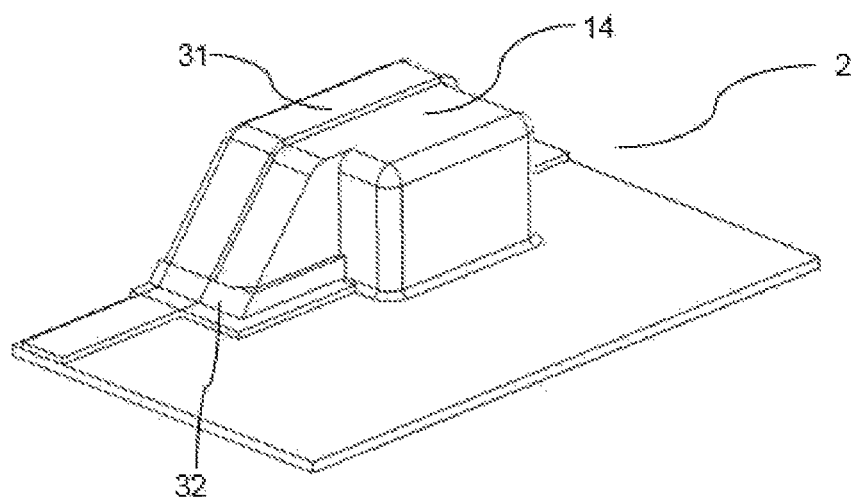
FIG. 9 is a three-dimensional schematic view of the inner face of the outer panel of FIG. 8 to which the second glue bead is applied.

Apart from the conventional glue bead 31, the tailgate according to embodiments of the invention conceives of using an additional glue bead 32 at the gap 27 to seal the gap 27 to ensure that the cavity 25 is water-tight, as shown on FIG. 9. This additional glue bead 32 can be qualified as second glue bead, and thus the conventional glue bead 31 can be qualified as first glue bead. The first glue bead 31 and the second glue bead 32 are preferably applied in such a way that they overlap and cross each other, and their up and down overlap order may be interchanged.

Figure 6:
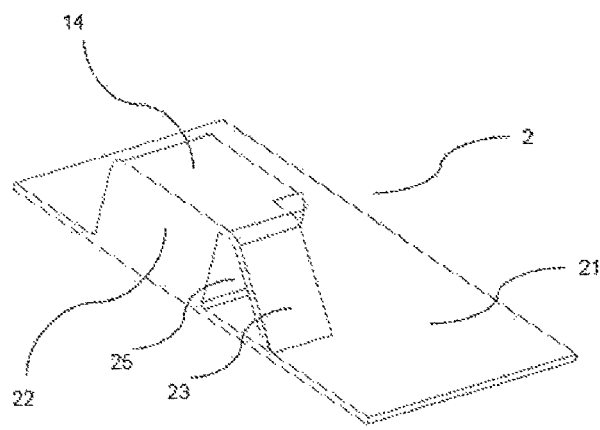
FIG. 6 is a three-dimensional schematic view from another angle of the outer panel of FIG. 5.

In particular, in the tailgate according to embodiments of this invention, since the visual defects such as sink marks or flow lines are attenuated at their source, by reducing the junctions between the inner face of the skin 21 and the walls 23, 26 which project from the housing 14 towards the inner face of the skin 21 and which participate in delimiting the cavity 25, it is possible that a thickness of a free end (i.e. a "suspended" end due to the presence of the gap 27) of the wall (or the walls) amongst these walls which does not (or do not) touch the inner face of the skin 21 is not reduced. However, it is preferred that this thickness is reduced. For example, FIG. 6 shows that the thickness of the free end of the outer face of the bridge wall 23 is reduced. This reduced thickness favours the passage of the second glue bead 32 under this free end in order to ensure that both sides of the bridge wall 23 are water-tight. Alternatively, the wall (or walls) amongst the walls which does not (or do not) touch the inner face of the skin 21 forms (or form) a groove for receiving the second glue bead 32.

According to an embodiment of the invention, the gap 27 is located behind or near a style line 13 which can be seen on the appearance surface of the skin 21. This allows to mask and attenuate the visual defects which, even if they are reduced, may nevertheless be generated. As shown on FIG. 1, this style line 13 often corresponds to a fold of the skin 21 of the outer panel 2 and this fold forms a square or a visually interrupted line on the appearance surface of the tailgate 12.

A method for manufacturing a tailgate according to an embodiment of this invention is described below. According to this method, when moulding the outer panel 2 of the tailgate 12, a movable slider is used in a mould to manufacture the cavity 25 delimited by the skin 21, the peripheral wall 22, the bridge wall 23 and the lateral wall 26. This allows thus to mould the cavity 25, even if it is no longer possible to demould the cavity 25 naturally since it is covered by the bridge wall 23. For moulding of injection type, this movable slider is a retractable core. The movable slider can be easily removed from another non-closed side of the cavity 25, this non-closed side being opposite the side closed by the lateral wall 26 according to an embodiment of this invention.

Similarly, according to the method, the main steps for assembling by gluing the outer panel 2 with the inner panel 1 to form the tailgate 12 are as follows:

applying glue with a robot on the inner face of the outer panel 2, the glue applicator of the robot being able to access the various positions of the inner face very easily and move smoothly along this inner face because the abrupt angle of the inner face is reduced by means of the bridge wall 23;

making the glue applicator of robot move on the inner face of the outer panel 2 in order to form a continuous gluing binding intended to glue the inner panel 1, then making the glue applicator of the robot move along the gap 27 which is located between on the one hand, the bridge wall 23 or the lateral wall 26, and on the other hand, the inner face of the skin 21, to apply an additional glue bead intended to seal the cavity 25 at the gap 27;

then, pressing, in the main direction of assembly of the tailgate, with a suitable pressure, the outer panel 2 and the inner panel 1, to assemble the two panels by gluing, such that the glue is compressed uniformly (spread and equalised) on the positions where it is applied to form the first glue bead 31 and the second glue bead 32 which are deposited on top of each other (i.e. they overlap) and cross each other, in order to ensure the water-tightness between the inner and outer panels as well as at the gap 27.

This invention is described above using a limited number of embodiments. However, those skilled in the art will understand that, if no prejudice is brought to the principles of this invention, modifications even major modifications can be made to the embodiments described and to their details, without departing from the scope of this invention which is only defined by the attached claims.

The invention claimed is:

1. A vehicle tailgate made of a plastic material, comprising: an inner panel, an outer panel, and a first glue bead applied between the inner panel and the outer panel such that the inner panel and the outer panel are assembled via the glue bead and an inner space is disposed between the inner panel and the outer panel, the outer panel having:
    a skin with an appearance surface;
    a housing configured to receive an optical unit, delimited by a peripheral wall joined to the skin; and
    a cavity delimited by the skin, at least a portion of the peripheral wall of the housing, and walls projecting from the housing towards an inner face of the skin,
    wherein at least one of the walls projecting from the housing towards the inner face of the skin does not touch the inner face of the skin, such that there is a gap between said at least one wall and the inner face of the skin, and
    wherein said gap is sealed by a second glue bead.

2. The vehicle tailgate according to claim 1, wherein the walls projecting from the housing towards the inner face of the skin comprise a bridge wall and a lateral wall, the bridge wall covering an angle formed by the housing and the inner face of the skin and the lateral wall closing the cavity on one side of the cavity.

3. The vehicle tailgate according to claim 1, wherein the gap is located behind or near a style line which is visible on the appearance surface of the skin.

4. The vehicle tailgate according to claim 1, wherein the first glue bead and the second glue bead overlap and cross each other.

5. The vehicle tailgate according to claim 1, wherein the first glue bead is applied on the inner face of the outer panel and forms a continuous sealing binding.

6. The vehicle tailgate according to claim 1, wherein the first glue bead and the second glue bead are formed of water-tight glue applied by a robot.

7. The vehicle tailgate according to claim 1, wherein a thickness of a free end of the at least one wall which does not touch the inner face of the skin is reduced to facilitate passage of the second glue bead under the free end, in order to ensure that on both sides of the at least one wall is water-tight.

8. The vehicle tailgate according to claim 1, wherein a free end of the at least one wall which does not touch the inner face of the skin forms a groove for receiving the second glue bead.

9. A method for manufacturing a vehicle tailgate according to claim 1, wherein a movable slider is used in a mould to manufacture the cavity during moulding of the outer panel, and the tailgate is formed by assembling by gluing the outer panel with the inner panel, by means of the following steps:
    applying glue on the inner face of the outer panel to form the first glue bead;
    applying the glue along the gap to form the second glue bead; and
    pressing, in a main direction of assembly of the tailgate, with a suitable pressure, the outer panel and the inner panel, to assemble them by gluing.

10. The vehicle tailgate according to claim 1, further comprising a water-tight inner space between the inner panel and the outer panel.

11. The vehicle tailgate according to claim 1, wherein the cavity is water-tight.

12. A vehicle tailgate comprising:
    an inner panel;
    an outer panel comprising:
        a skin with an appearance surface;
        a housing configured to receive an optical unit delimited by a peripheral wall joined to the skin; and
        a cavity delimited by the skin, by at least a portion of the peripheral wall of the housing, and by one or more walls projecting from the housing towards an inner face of the skin,
        wherein at least one of the one or more walls projecting from the housing towards the inner face of the skin does not touch the inner face of the skin, such that there is a gap between the at least one wall and the inner face of the skin;
    a first glue bead disposed between and connected to the inner panel and the outer panel; and
    a second glue bead disposed in the gap.

13. The vehicle tailgate of claim 12, further comprising an inner space disposed between the inner panel and the outer panel.

* * * * *